United States Patent
Talwar et al.

(10) Patent No.: US 6,891,902 B2
(45) Date of Patent: May 10, 2005

(54) SYSTEM AND METHOD FOR ADJUSTING A POWER LEVEL OF A TRANSMISSION SIGNAL

(75) Inventors: Shilpa Talwar, Palo Alto, CA (US); Jose Tellado, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 10/189,755

(22) Filed: Jul. 2, 2002

(65) Prior Publication Data

US 2004/0005014 A1 Jan. 8, 2004

(51) Int. Cl.[7] .............................................. H04L 25/49
(52) U.S. Cl. ...................................... 375/296; 375/297
(58) Field of Search ................................ 375/295, 296, 375/297, 135, 146, 254, 298, 346, 350, 130

(56) References Cited

U.S. PATENT DOCUMENTS

| | | | |
|---|---|---|---|
| 5,150,381 A | * | 9/1992 | Forney et al. ............... 375/261 |
| 5,214,672 A | * | 5/1993 | Eyuboglu et al. ........... 375/254 |
| 5,287,387 A | | 2/1994 | Birchler ....................... 375/296 |
| 5,638,403 A | * | 6/1997 | Birchler et al. ............. 375/296 |
| 5,727,026 A | * | 3/1998 | Beukema ...................... 375/296 |
| 5,835,536 A | * | 11/1998 | May et al. ................... 375/260 |
| 6,175,270 B1 | * | 1/2001 | Vannucci ........................ 330/2 |
| 6,292,054 B1 | * | 9/2001 | Ma et al. ..................... 330/126 |
| 6,298,094 B1 | | 10/2001 | Dehner et al. |
| 6,356,606 B1 | * | 3/2002 | Hahm ........................ 375/350 |
| 6,373,901 B1 | * | 4/2002 | O'Dea et al. ............... 375/296 |
| 6,515,961 B1 | * | 2/2003 | Weaver et al. .............. 370/206 |
| 2002/0080891 A1 | | 6/2002 | Ahn et al. |
| 2003/0067990 A1 | * | 4/2003 | Bryant ........................ 375/259 |

OTHER PUBLICATIONS

M. Pauli, H.P. Kuchenbecker, Minimization of the Intermodulation Distortion of a Nonlinearly Amplified OFDM Signal, 1996, Wireless Personal Communications, Netherlands.

Richard Van Nee et al, Reducing the peak–to–Average Power Ratio of OFDM, May 18, 1998 IEEE, pp. 2072–2076, P010288263.

* cited by examiner

*Primary Examiner*—Chieh M. Fan
*Assistant Examiner*—Jason M. Perilla
(74) *Attorney, Agent, or Firm*—Michael A. Proksch (57) ABSTRACT

The invention includes an apparatus and a method for adjusting a power level of a transmission signal for minimal distortion. The method includes modulating the transmission signal. The modulated transmission signal is processed to reduce a peak to average ratio of the modulated transmission signal based upon modulation parameters of the modulated transmission signal. The power level of the modulated transmission signal is adjusted according to the peak to average ratio of the modulated transmission signal. The transmission signal is amplified and transmitted.

26 Claims, 9 Drawing Sheets

SYSTEM AND METHOD FOR ADJUSTING A POWER LEVEL OF A TRANSMISSION SIGNAL

FIELD OF THE INVENTION

The invention relates generally to wireless communications. More particularly, the invention relates a method and system for adjusting a power level of a transmission signal to minimize distortion of the transmission signal.

BACKGROUND OF THE INVENTION

Wireless communication systems commonly include information carrying modulated carrier signals that are wirelessly transmitted from a transmission source (for example, a base transceiver station) to one or more receivers (for example, subscriber units) within an area or region.

Figure 1:
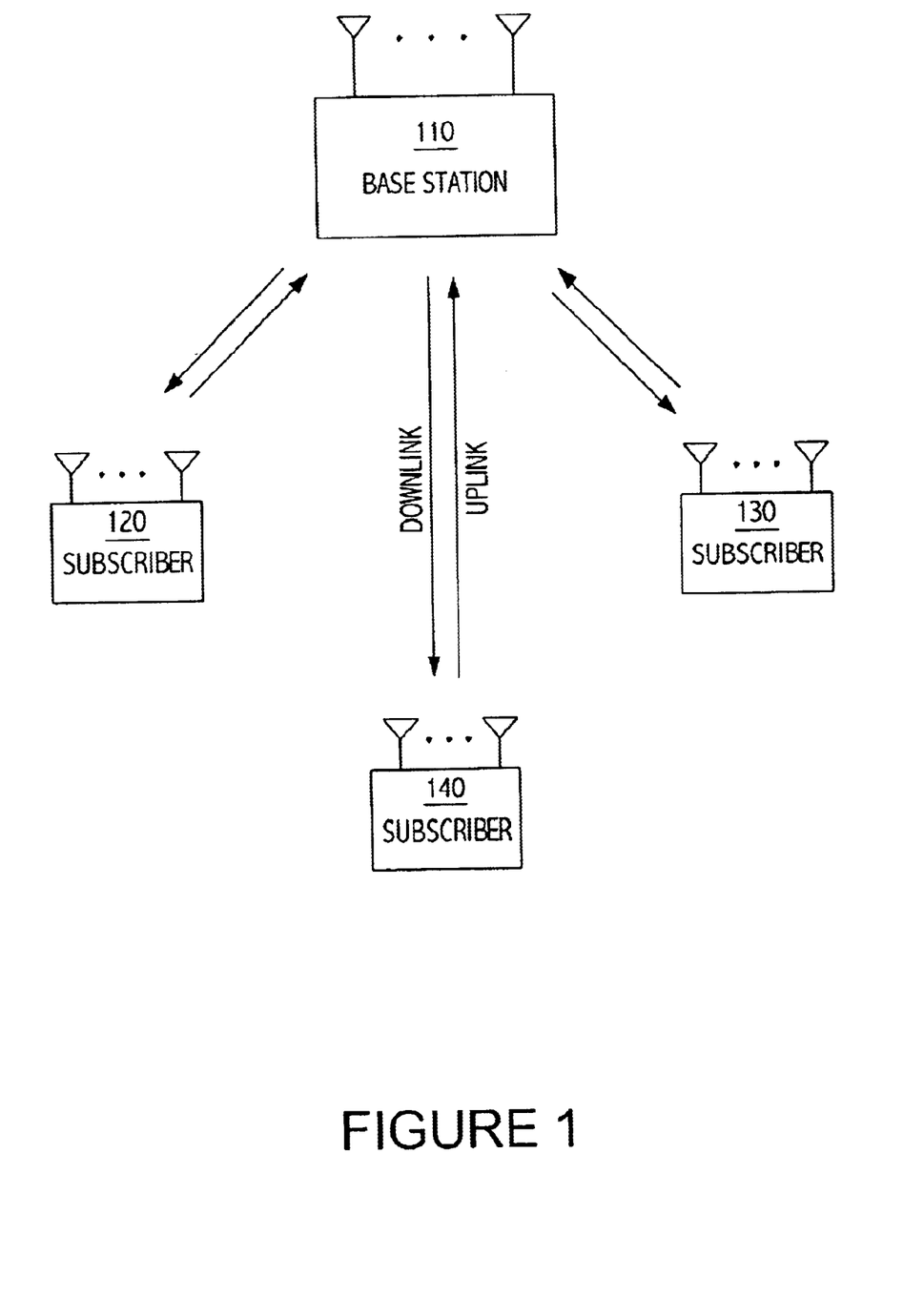
FIG. 1 shows a prior art wireless system that includes a transceiver and multiple subscriber units.

FIG. 1 shows a portion of a single cell of a cellular wireless network system. A base transceiver station 110 provides a wireless connection to a plurality of subscriber units 120, 130, 140. The base transceiver station is generally connected to a network that provides access to the Internet. The cell of FIG. 1 is generally repeated forming a cellular network. The base transceiver station 110 and the subscriber units 120, 130, 140 include one or more antennas allowing two-way communication between the base transceiver station 110 and the subscriber units 120, 130, 140.

Figure 2:
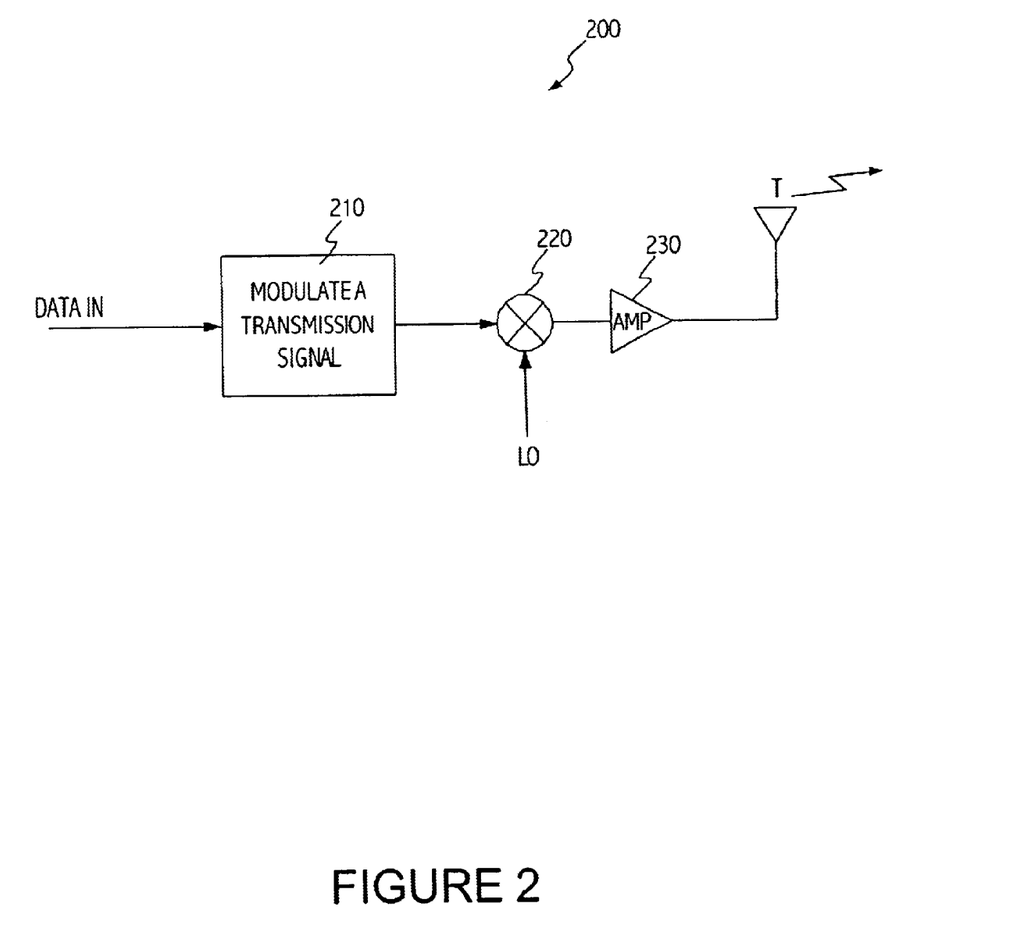
FIG. 2 shows a typical transmission chain of a wireless transmitter.

FIG. 2 shows a typical transmission chain 200 of a wireless transmitter or transceiver. The transmitter receives a stream of data (Data In) to be transmitted. A transmission signal is modulated by the stream of data by a modulator 210. The modulated transmission signal is typically frequency up converted by mixing the modulated carrier signal with a local oscillator (LO) signal through a frequency mixer 220. The frequency up converted signal is generally amplified by a power amplifier 230 before transmission through a transmission antenna T.

Distortion of the modulated transmission signal by the transmission chain 200 can reduce the effectiveness of signal transmission from the transmitter to a receiver. The power amplifier 230 can cause distortion to modulated transmission signal if the amplitude of the modulated transmission signal is too large, and therefore, reduce the effectiveness of the signal transmission.

Figure 3:
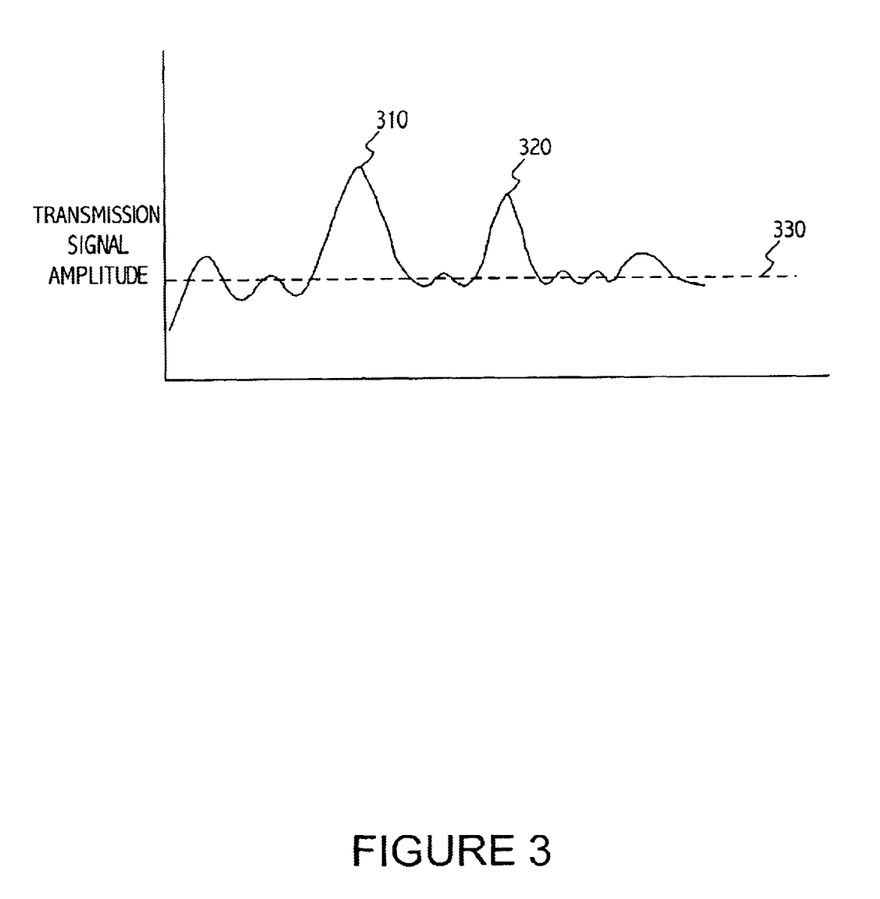
FIG. 3 shows a waveform representing an amplitude of a typical transmission signal.

FIG. 3 shows a example of a typical modulated transmission signal in which the amplitude of the modulated transmission signal varies with time. The modulated transmission signal typically include peaks 310, 320 which indicate the maximum modulated transmission signal amplitude over the time period of interest. A dashed line 330 indicates an average signal amplitude of the modulated transmission signal. A peak to average ratio (PAR) is defined as the ratio of the peaks of the amplitude of the signal, to the average amplitude of the signal.

Generally, it is desirable to maintain a particular average power level. For example, an average power level can insure a desired signal to noise ratio of the received transmission signal. Therefore, it is generally at the peaks 310, 320 in which the power amplifier 230 causes distortion of the modulated transmission signal.

Figure 4:
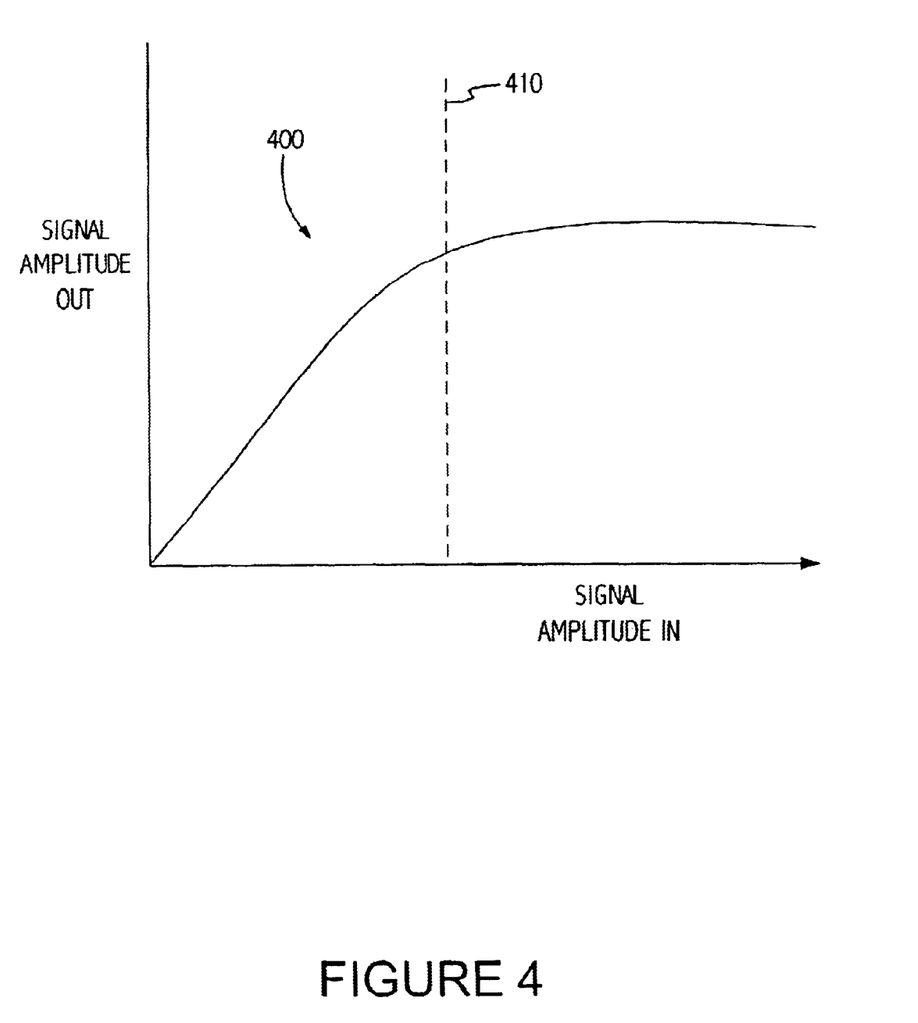
FIG. 4 shows a curve representing an input signal amplitude versus output signal amplitude of a typical power amplifier of a transmitter.

FIG. 4 shows a typical curve 400 representing a relationship between the input signal amplitude versus output signal amplitude of the power amplifier 230. The curve 400 is typically linear until the output signal power become large enough that the power amplifier 230 begins to saturate. Dashed line 410 roughly designates the point in which the power amplifier transitions from an essentially linear range to a non-linear range. As the input signal amplitude increase past the dashed line 410, the output signal amplitude compresses and no longer linearly increases. Operation of the power amplifier in the non-linear range distorts the modulated transmission signal.

It is clear from FIG. 3 and FIG. 4, that it is desirable to minimize the PAR of the modulated transmission signal. It is also clear that the power level of a modulated transmission signal having a given PAR should be adjusted so that the peaks of the modulated transmission signal do not cause a power amplifier of wireless transmitter to saturate, and therefore, distort modulated transmission signal of the transmitter.

Reduction of the PAR of the modulated transmission signal provides two advantageous features. First, a reduced PAR allows transmission of a greater average transmission signal power level. This provides the advantage of an enhanced signal to noise ratio. Second, a reduced PAR allows for the use of a typically less expensive power amplifier for a given average transmission signal power level. That is, the non-linear region of a power amplifier is typically reached at a lower output power level than for a less expensive power amplifier. Therefore, the reducing the amplitudes of peaks of the transmission signal generally allows for the use of a less expensive power amplifier for a given transmission signal power level.

It is desirable to have an apparatus and method that provides reduction of a PAR of a transmission signal. It is additionally desirable to provide adjustment of the average power level of the transmission signal so that a power amplifier of a transmitter of the transmission signal does not excessively distort the transmission signal.

SUMMARY OF THE INVENTION

The invention includes an apparatus and a method for reducing the PAR of a transmission signal to minimize distortion of the transmission signal. The invention further includes adjusting the power level of the transmission signal.

An embodiment of the invention includes a method for adjusting a power level of a transmission signal for minimal distortion. The method includes modulating the transmission signal. The modulated transmission signal is processed to reduce a peak to average ratio of the modulated transmission signal based upon modulation parameters of the modulated transmission signal. The power level of the modulated transmission signal is adjusted according to the peak to average ratio of the modulated transmission signal. The transmission signal is amplified and transmitted.

Other aspects and advantages of the present invention will become apparent from the following detailed description, taken in conjunction with the accompanying drawings, illustrating by way of example the principles of the invention.

DETAILED DESCRIPTION

As shown in the drawings for purposes of illustration, the invention is embodied in a method and system for reducing the PAR of a transmission signal to minimize distortion of the transmission signal. The invention further includes adjusting the power level of the transmission signal.

Particular embodiments of the present invention will now be described in detail with reference to the drawing figures. The techniques of the present invention may be implemented in various different types of wireless communication systems. Of particular relevance are cellular wireless communication systems. A base station transmits downlink signals over wireless channels to multiple subscribers. In addition, the subscribers transmit uplink signals over the wireless channels to the base station. Thus, for downlink communication the base station is a transmitter and the subscribers are receivers, while for uplink communication the base station is a receiver and the subscribers are transmitters. Subscribers may be mobile or fixed. Exemplary subscribers include devices such as portable telephones, car phones, and stationary receivers such as a wireless modem at a fixed location.

The techniques of the present invention apply to point-to-multipoint systems, they are not limited to such systems, but apply to any wireless communication system having at least two devices in wireless communication. Accordingly, for simplicity, the following description will focus on the invention as applied to a single transmitter-receiver pair, even though it is understood that it applies to systems with any number of such pairs.

Point-to-multipoint applications of the invention can include various types of multiple access schemes. Such schemes include, but are not limited to, time division multiple access (TDMA), frequency division multiple access (FDMA), code division multiple access (CDMA), orthogonal frequency division multiple access (OFDMA) and wavelet division multiple access.

The transmission can be time division duplex (TDD). That is, the downlink transmission can occupy the same channel (same transmission frequency) as the uplink transmission, but occur at different times. Alternatively, the transmission can be frequency division duplex (FDD). That is, the downlink transmission can be at a different frequency than the uplink transmission. FDD allows downlink transmission and uplink transmission to occur simultaneously.

Typically, variations of the wireless channels cause uplink and downlink signals to experience fluctuating levels of attenuation, interference, multi-path fading and other deleterious effects. In addition, the presence of multiple signal paths (due to reflections off buildings and other obstacles in the propagation environment) causes variations of channel response over the frequency bandwidth, and these variations may change with time as well. As a result, there are temporal changes in channel communication parameters such as data capacity, spectral efficiency, throughput, and signal quality parameters, e.g., signal-to-interference and noise ratio (SINR), and signal-to-noise ratio (SNR).

Information is transmitted over the wireless channel using one of various possible transmission modes. For the purposes of the present application, a transmission mode is defined to be a particular modulation type and rate, a particular code type and rate, and may also include other controlled aspects of transmission such as the use of antenna diversity or spatial multiplexing. Using a particular transmission mode, data intended for communication over the wireless channel is coded, modulated, and transmitted. Examples of typical coding modes are convolution and block codes, and more particularly, codes known in the art such as Hamming Codes, Cyclic Codes and Reed-Solomon Codes. Examples of typical modulation modes are circular constellations such as BPSK, QPSK, and other m-ary PSK, square constellations such as 4QAM, 16QAM, and other m-ary QAM. Additional popular modulation techniques include GMSK and m-ary FSK. The implementation and use of these various transmission modes in communication systems is well known in the art.

Figure 5:
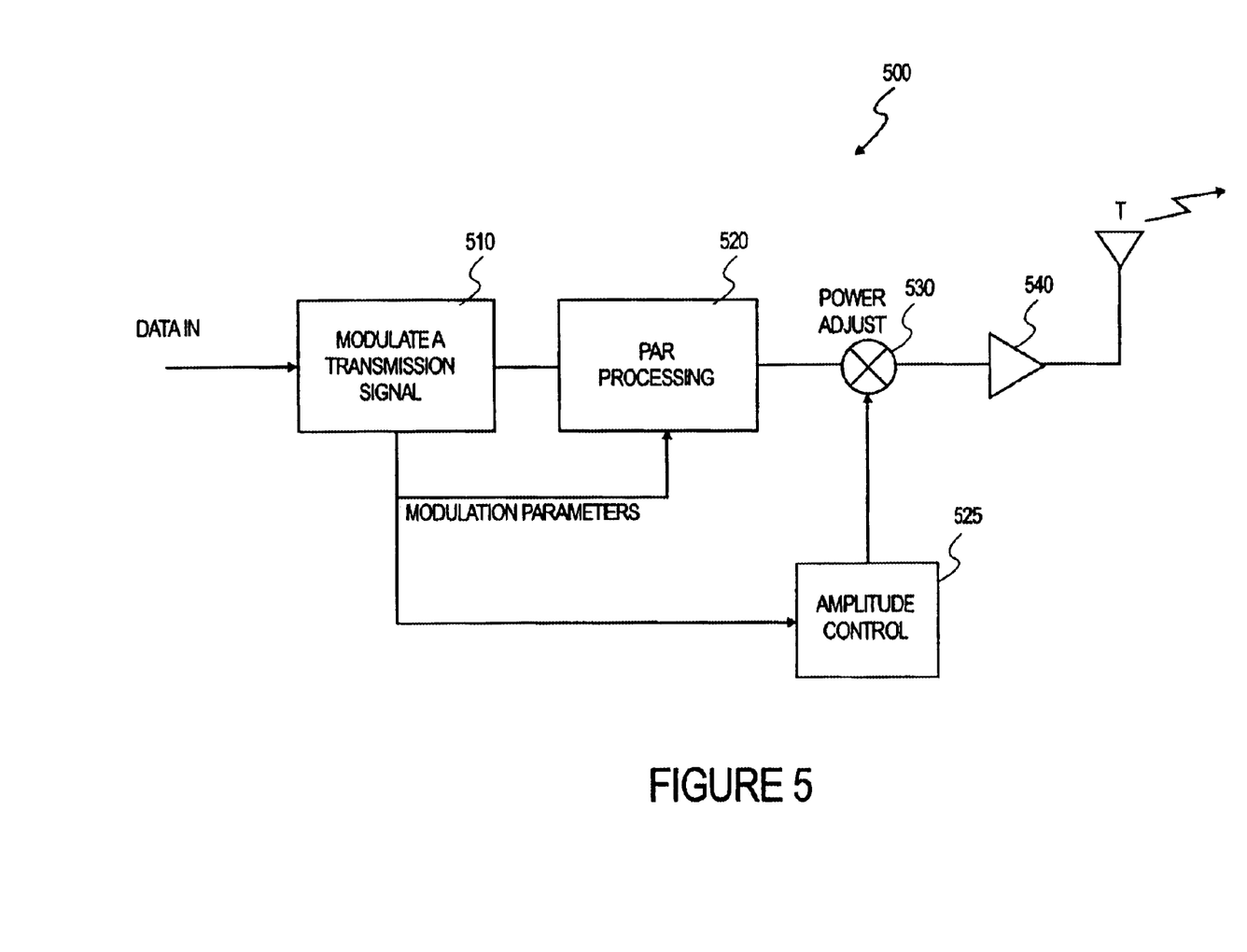
FIG. 5 shows an embodiment of the invention.

FIG. 5 shows an embodiment of the invention. This embodiment includes a transmitter chain 500.

The transmitter chain 500 includes a modulator 510 that receives a stream of data. The modulator modulates a carrier signal with the stream of data according to any of the previously mentioned typical modulation modes.

The modulated transmission signal is processed by a peak to average ratio (PAR) processing block 520. The PAR processing block 520 generally reduces the PAR of the modulated transmission signal. The processing to some extent is dependent upon the modulation parameters, such as the order of modulation or modulation rate. Therefore, the PAR processing block 520 also receives modulation order information from the modulator 510.

A power level adjuster 530 varies the amplitude of the PAR processed modulated transmission signal. The power level adjuster 530 can be a variable attenuator. As will be described later, the PAR of the processed modulated transmission signal is to some extent dependent upon the modulation parameters. Therefore, the optimal setting of the power level adjuster 530 is to some extent dependent upon the modulation parameters.

An amplitude controller 525 controls the power level adjuster 530. As previously mentioned, the modulation parameters of the modulated transmission signal effects the PAR of the modulated transmission signal. Therefore, the amplitude controller 525 receives the modulation information (order and rate) to help control the power lever adjuster 530.

A power amplifier 540 amplifies the modulated transmission signal before transmission from a transmission antenna T. As previously described, the power amplifier 540 distorts the modulated transmission signal when the amplitude of peaks of the modulated transmission signal are too large.

PAR Processing

The PAR processing block 520 receives the modulated transmission signal and reduces the PAR of the modulated transmission signal. Reducing the PAR provides the previously described benefits of allowing a higher average transmission signal power level, or the use of a less expensive power amplifier.

Figure 6:
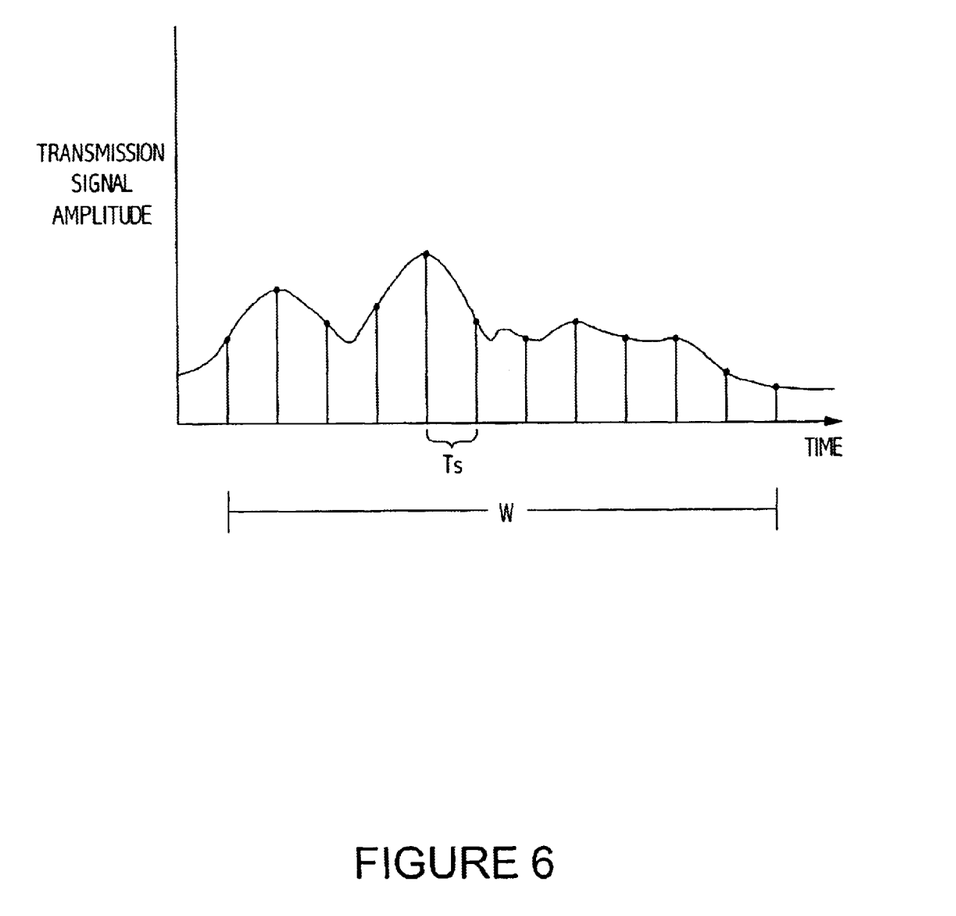
FIG. 6 shows time samples of a modulated transmission signal.

An embodiment of the invention includes windowing samples of the modulated transmission signal to reduce the PAR. For example, FIG. 6 shows time samples of a modulated transmission signal. These time samples can be windowed to reduce the PAR. The windowing introduces limited or controlled distortion of the modulated transmission signal, and prevents the transmission chain from substantially distorting the modulated transmission signal.

The sample spacing Ts of the modulated transmission signal is determined by the maximum frequency component of the modulated transmission signal. Generally, the sampling period Ts is chosen to provide one to four times over-sampling of the modulated transmission signal. The greater sampling rates can be advantageous because peaks of the modulated transmission signal are less likely to be missed.

Figure 7:
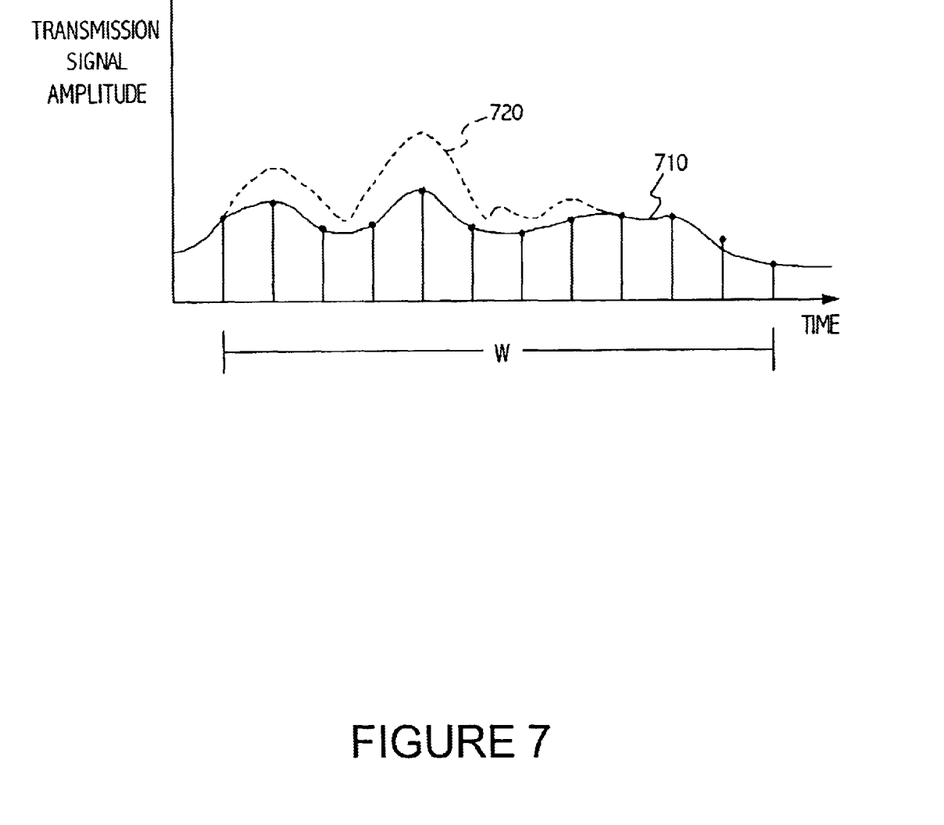
FIG. 7 shows a sample modulated transmission signal waveform after being windowed, and before being windowed.

FIG. 7 shows a sample modulated transmission signal waveform after being windowed 710, and before being windowed 720. As shown, the windowing reduces the PAR of the modulated transmission signal.

The length of the windowing W is generally dependent upon the data bandwidth of the modulated transmission signal. Typically, the greater the data bandwidth, the greater the length of window.

The windowing based PAR reduction scheme of the invention can adaptively adjust the window length W base upon requirements of the wireless system of the transmitter. As previously mentioned, the windowing introduces a controlled distortion of the modulated transmission signal. The introduced signal distortion can be both in-band and out-of-band.

In-band distortion generally refers to distortion of the transmission signal within the transmission frequency band of the transmission signal. In-band distortion must generally meet a criterion required to ensure a particular bit error rate (BER) of the transmission signal. Smaller window length results in less in-band distortion but more out-of-band distortion, and vice versa.

Out-of-band distortion generally refers to distortion of the transmission signal outside of the transmission frequency band of the transmission signal. Out-of-band distortion can interfere with other transmission signals. The out-of-band distortion must generally meet a criterion as established by, for example, the FCC. Typically, longer window lengths are used to minimize out-of-band distortion.

The windowing can include any one of several possible windows. For example, some well known windows include Hamming, Hanning, Chebychev and Gaussian windows.

An embodiment of the invention includes a look-up-table (LUT) that determines the window length for each signal bandwidth available to the transmitter. Generally, this embodiment is implemented in hardware. The length of the window is selected so that the out-of-band distortion criterion is met for each transmission bandwidth. Therefore, as the transmission is assigned more or less bandwidth over time, a longer or shorter window may be used to reduce the transmit signal PAR. An embodiment includes storing only the longest window, and deriving smaller windows by sub-sampling the longest window.

PAR reduction also causes in-band distortion in the transmitted signal. The distortion is function of several parameters, such as post-processing (output) PAR, window type, window length, and probability distribution of input signal samples. The most influential parameter, however, is the output PAR. The lower the required output PAR, the greater the distortion. The amount of distortion that can be tolerated without significantly degrading the receiver SINR or the system's BER performance is a function of order of modulation. Higher order modulations such as 16 and 64 QAM typically require higher receiver SINR's for proper operation, and can therefore, tolerate less distortion. Lower order constellations such as 4 QAM require lower SINR's and can tolerate higher distortion.

An embodiment of the invention includes adaptive modulation and coding in which the PAR processing should generally only introduce a small amount of PAR distortion. Therefore, the resultant signal-to-interference-and-noise-and-distortion (SINDR) at a receiver is only slightly lower than it would be without PAR processing, for example 0.1 to 1 dB. Similarly, the PAR processing can be such that there is a minimal increase in receiver BER after decoding. An implementation includes a look-up-table that can be used to determine output PAR as a function of modulation order or modulation order and code rate. In general, higher order modulations include higher output PAR, while lower order modulations include lower output PAR. As the wireless channel changes over time, the modulation order and possibly the code rate can be adapted to optimize receiver performance. Consequently, the PAR processing can be adapted based on output PAR specified in the LUT.

The invention includes finding peaks in a transmission signal, centering a window, and determining an amplitude for the window. A peak is defined as a signal sample with amplitude that is greater than a threshold. The threshold is a direct function of desired output PAR. That is, Threshold= $AX_{rms}$, where $A=10^{PAR_{OUT}/20}$ and $X_{rms}$ is the root-mean-square value of the transmission signal. Peaks can occur in clusters, especially when the signal is over-sampled. A technique has been developed that determines a local maximum of a set (cluster) of peaks, and an attenuating window is centered at the local maximum. This technique is not always successful at reducing the output PAR to desired level because centering a window at the local maximum may not reduce peaks that are further away from the local maximum, since the peaks are not attenuated as much. Moreover, identifying a peak cluster is difficult to implement in hardware.

An embodiment of the invention includes a "generalized peak cluster", and includes a method for choosing the window center and the window amplitude such that all peaks within the generalized cluster are simultaneously reduced to below the PAR threshold.

A generalized peak cluster is defined to be a set of P samples, in which the first sample of the P samples exceeds a PAR threshold. The selection of P is predetermined based on peak statistics and desired hardware complexity. A value of P=1 corresponds to a cluster of length one, and requires each peak to be windowed independently, which includes significant hardware complexity. If the desired output PAR is low, there can be significant number of peaks that exceed the PAR threshold. It is desirable to simultaneously reduce a set of peaks to simplify hardware implementation. This can be achieved by choosing P to be larger than a maximum length of a peak cluster or multiple neighboring peak clusters (namely generalized peak cluster). The length of a generalized peak cluster typically depends on how much the transmission signal is over-sampled and a statistical distribution of signal samples.

The larger the value of P, the fewer windows required to be implemented in hardware. However, as P increases, the window amplitude increases, leading to more attenuation of input samples and thereby causing more distortion. Typically, P is chosen to be a fraction of window length (⅛, ¼, etc). However, P may be as large as the window length to simplify hardware complexity.

Mathematically, the problem of generalized peak reduction can be expressed as follows. Given a window fixed g(n), a window amplitude α and window center β can be determined such that when the resulting PAR reduction window $$w(n)=1-\alpha g(n-\beta)$$

is multiplied with the transmission signal x(n), no peaks occur within a peak cluster of length P. That is;

$$y(n)=x(n)[1-\alpha g(n-\beta)]$$

includes no amplitude values greater than the PAR threshold, $A_X \equiv AX_{rms}$, for n=p, p+1, ..., p+P−1.

Assuming there is only 1 peak within cluster of length P, then by definition, the peak must be at the first sample n=p. The optimal choice for α and β are $$\alpha = 1 - \frac{A_X}{|x(p)|}, \quad \beta = p.$$

Assuming there are 2 peaks with a peak cluster at samples n=p and n=m. Then the optimal choice for α and β is determined by minimizing the following expression over values of β in the range p≦β≦m:

$$\max\left[\frac{a_p}{g(p-\beta)}, \frac{a_m}{g(m-\beta)}\right],$$

in which the variable $a_k$ is defined as $$a_k = 1 - \frac{A_X}{|x(k)|}$$

for a peak at sample k. The value of β that minimizes the expression is the window center, and the corresponding minimum value of the expression is the window amplitude α.

In general, assuming there are multiple peaks within a peak cluster of length P, for example at samples n=p, n=m, ..., and n=l. Then the optimal choice for α and β is obtained by optimizing the following min-max criterion $$\alpha = \min_{p \leq \beta \leq l}\left[\max\left[\frac{a_p}{g(p-\beta)}, \frac{a_m}{g(m-\beta)}, \cdots, \frac{a_l}{g(m-l)}\right]\right]$$

and β is the value that yields the minimum of min-max criterion.

The hardware implementation of min-max criterion can be complex for large values of P. An embodiment includes the expression min-max criterion being evaluated at only the peaks rather than over the whole range of β. Another embodiment includes the min-max criterion being evaluated at a select set of peaks where the peak selection may be based on some desired criterion. In an embodiment, the min-max criterion is only evaluated at two peaks n=r and n=s, where n=r corresponds to the largest peak in first-half of peak cluster and n=s corresponds to largest peak in second half of the peak cluster. This approach is sub-optimal, and the desired output PAR is not exactly achieved, but is very close.

An embodiment includes the PAR reduction scheme described being combined with a linearization scheme that linearizes the amplitude characteristic of transmitter amplifier. An example of such a scheme is a predistorter that pre-corrects for the nonlinearity in amplifier response before amplification. Predistortion can be implemented digitally by pre-characterizing the amplifier response. The response can change over time, so the response must be measured and compensated for adaptively. The combination of PAR reduction with amplifier linearization results in efficient use of the power amplifier and causes no additional distortion since the amplifier is being operated only in a linearized region.

Figure 8:
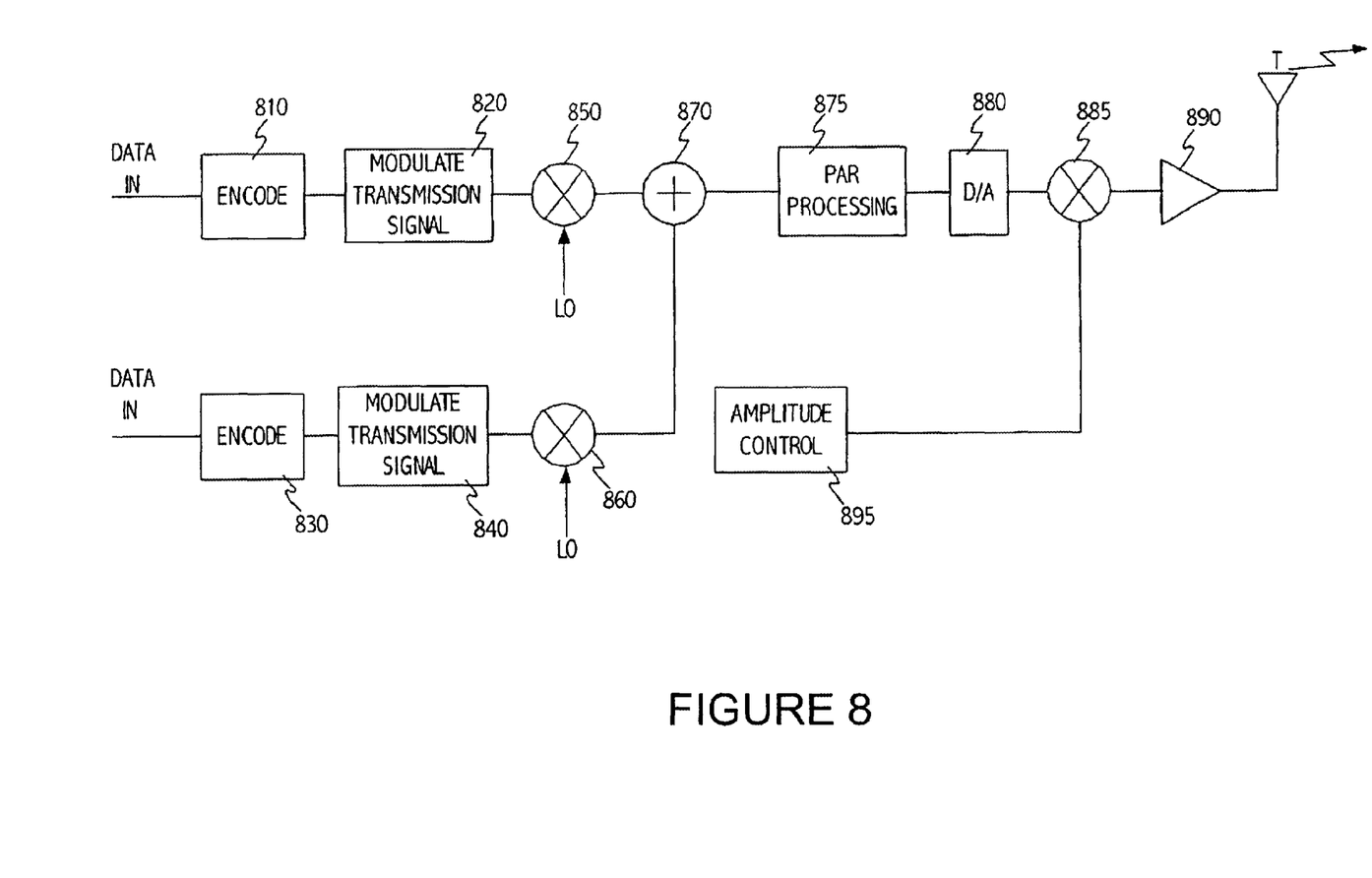
FIG. 8 shows another embodiment of the invention.

FIG. 8 shows another embodiment of the invention. This embodiment includes a first transmitter chain and a second transmitter chain. Additional transmitter chains can be included.

The first transmitter chain includes an encoder 810, a modulator 820 and a frequency up converter 850.

The second transmitter chain includes an encoder 830, a modulator 840 and a frequency up converter 860.

A summer 870 receives and combines modulated transmission signals from the first transmitter chain and the second transmitter chain.

A PAR processor 875 according to the invention provides the previously described PAR processing. A digital to analog (D/A) converter 880 converts digital signal into analog signals before transmission.

An amplitude adjuster 885 is controlled by an amplitude controller 895 to provide adjustment of an amplitude of the transmission signals before being transmitted through a transmitter antenna T.

The inclusion of multiple transmitter chains and the corresponding transmission signals generally increases the PAR of the combined transmitted signal. The transmission signals corresponding to different transmitter chains can each include different modulation rates, and/or different codes. The LO for each transmission chain can be a different frequency for a multiple carrier transmission system. For a multi-code code division multiplexed access (CDMA) system, the transmitter signals can be generated by including a different code for each transmitter chain. For such a system, the LO of each chain can be the same, and therefore, located between the summer 870 and the PAR processor 875. Multi-code CDMA can be used to increase the data rate associated with the transmission signal.

The previously described processing techniques can be used to reduce the PAR of the transmission signal. The PAR processing should be based upon the modulation parameters of the signal of the transmitter chain that requires the minimum distortion.

Figure 9:
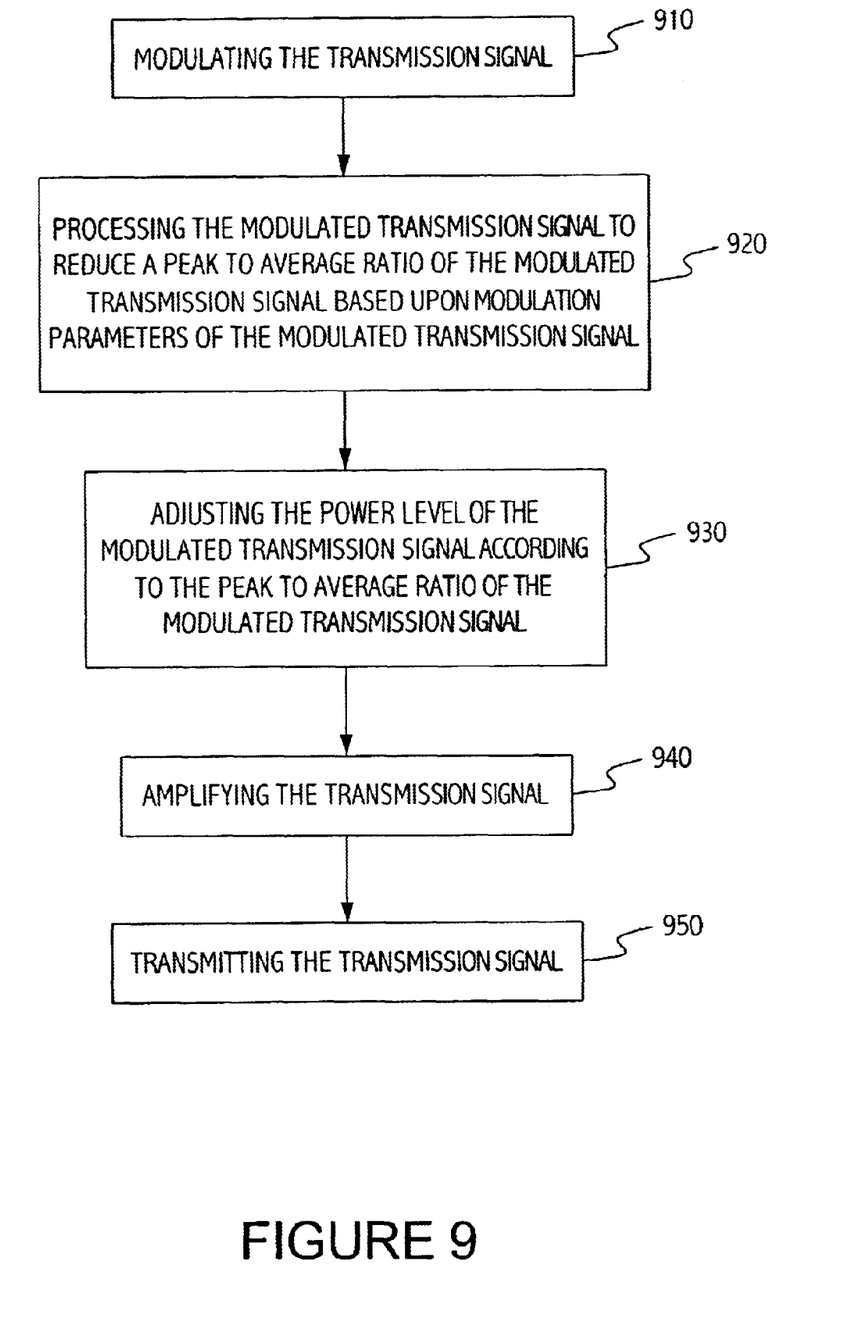
FIG. 9 shows a flow chart of steps included within an embodiment of the invention.

FIG. 9 shows a flow chart of steps included within an embodiment of the invention. A first step 910 includes modulating the transmission signal. A second step 920 includes processing the modulated transmission signal to reduce a peak to average ratio of the modulated transmission signal based upon modulation parameters of the modulated transmission signal. A third step 930 includes adjusting the power level of the modulated transmission signal according to the peak to average ratio of the modulated transmission signal. A fourth step 940 includes amplifying the transmission signal. A fifth step 950 includes transmitting the transmission signal.

Although specific embodiments of the invention have been described and illustrated, the invention is not to be limited to the specific forms or arrangements of parts so described and illustrated. The invention is limited only by the appended claims.

What is claimed:

1. A method for adjusting the power level of a transmission signal for minimal distortion, comprising:
    modulating the transmission signal;
    processing the modulated transmission signal to reduce a peak to average ratio of the modulated transmission signal based upon modulation parameters including at least one of a modulation rate and a modulation order of the modulated transmission signal;

adjusting the power level of the processed modulated transmission signal based upon modulation parameters of the modulated transmission signal;

amplifying the adjusted processed modulated transmission signal; and transmitting the amplified adjusted processed modulated transmission signal.

2. The method for adjusting the power level of a transmission signal of claim 1, wherein adjusting the power level of the modulated transmission signal is dependent upon the peak to average ratio of the modulated transmission signal.

3. The method for adjusting the power level of a transmission signal of claim 1, wherein processing the modulated transmission signal comprises windowing time samples of the modulated transmission signal.

4. The method for adjusting the power level of a transmission signal of claim 3, wherein windowing time samples is dependent upon a bandwidth of the modulated transmission signal.

5. The method for adjusting the power level of a transmission signal of claim 3, wherein windowing the time samples comprises centering the windowing dependent upon characteristics of the time samples.

6. The method for adjusting the power level of a transmission signal of claim 3, wherein an amplitude of the windowing is dependent upon characteristics of the time samples.

7. The method for adjusting the power level of a transmission signal of claim 1, wherein adjusting the power level of the modulated transmission signal based upon modulation parameters is adaptive to changes in the modulation parameters of the modulated transmission signal.

8. The method for adjusting the power level of a transmission signal of claim 1, wherein processing the modulated transmission signal to reduce a peak to average ratio of the modulated transmission signal is adaptive to changes in the modulation parameters of the modulated transmission signal.

9. The method for adjusting the power level of a transmission signal of claim 1, wherein a transmission channel that the modulated transmission signal is transmitted through is adaptive.

10. The method for adjusting the power level of a transmission signal of claim 3, wherein the windowing comprises at least one of Hamming, Hanning, Chebychev and Gaussian windows.

11. The method for adjusting the power level of a transmission signal of claim 3, wherein the windowing comprises a window length that is determined through the use of a look-up-table (LUT).

12. The method for adjusting the power level of a transmission signal of claim 11, wherein the look-up-table (LUT) provides a window length based upon a desired out-of-band distortion of the transmission signal.

13. The method for adjusting the power level of a transmission signal of claim 3, wherein the peak to average ratio is determined through the use of a look-up-table (LUT).

14. The method for adjusting the power level of a transmission signal of claim 13, wherein the look-up-table (LUT) provides the peak to average ratio based upon a modulation order of the transmission signal.

15. The method for adjusting the power level of a transmission signal of claim 11, wherein the look-up-table (LUT) provides the peak to average ratio based upon a modulation order and coding rate of the transmission signal.

16. The method for adjusting the power level of a transmission signal of claim 1, further comprising:

linearizing a transmitter amplifier that amplifies the modulated transmission signal.

17. The method for adjusting the power level of a transmission signal of claim 16, wherein linearizing a transmitter amplifier comprises:

pre-distorting the modulated transmission signal to pre-correct for non-linearities of the transmitter amplifier.

18. The method for adjusting the power level of a transmission signal of claim 17, wherein the pre-distorting is adaptive to changes in non-linearities of the transmitter amplifier over time.

19. The method for adjusting the power level of a transmission signal of claim 1, wherein the transmission signal includes signals from a plurality of transmission chains.

20. A method for adjusting a power level of a transmission signal for minimal distortion, comprising:

modulating the transmission signal;

processing the modulated transmission signal to reduce a peak to average ratio of the modulated transmission signal based upon modulation parameters including at least one of a modulation order and a modulation rate of the modulated transmission signal, wherein the processing the modulated transmission signal comprises windowing time samples of the modulation transmission signal;

adjusting the power level of the processed transmission signal based upon modulation parameters of the modulated transmission signal;

amplifying the adjusted processed modulated transmission signal; and transmitting the amplified adjusted processed modulated transmission signal.

21. An apparatus for adjusting a power level of a transmission signal for minimal distortion, comprising:

means for modulating the transmission signal;

means for processing the modulated transmission signal to reduce a peak to average ratio of the modulated transmission signal based upon modulation parameters including at least one of a modulation order and a modulation rate of the modulated transmission signal, wherein the means for processing the modulated transmission signal comprises means for windowing time samples of the modulation transmission signal;

means for adjusting the power level of the processed modulated transmission signal based upon modulation parameters of the modulated transmission signal;

means for amplifying the adjusted processed modulated transmission signal; and means for transmitting the amplified adjusted processed modulated transmission signal.

22. An apparatus comprising:

a processing block, responsive to one or more transmit chain(s), to process a modulated signal prior to transmission to reduce a peak to average ratio (PAR) of the modulated signal based, at least in part, on one or more modulation parameters including at least one of a modulation order and a modulation rate of the modulated signal; and a power level adjuster, responsive to the processing block, to selectively set a transmit power level of the processed modulated signal based, at least in part, on the modulation parameters of the modulated signal for transmission to a remote device.

23. An apparatus according to claim 22, further comprising:
a modulator, to receive content from a host device and generate the modulated signal representing the received content.

24. An apparatus according to claim 23, further comprising:
an amplitude controller, responsive to the modulator and coupled with the power adjuster, to provide a power level indication to the power level adjuster based, at least in part, on a modulation parameters used by the modulator.

25. An apparatus according to claim 22, further comprising:
an amplifier, responsive to the power level adjustor, to amplify the PAR adjusted modulated signal for transmission via one or more antenna(e).

26. A system comprising:
one or more antenna(e) through which to establish a communication channel with a remote device; and
a transmitter, selectively coupled with at least a subset of the one or more antenna(e), to process a modulated signal prior to transmission to reduce a peak to average ratio (PAR) of the modulated signal based, at least in part, on one or more modulation parameters including at least one of a modulation order and a modulation rate of the modulated signal, and to selectively set a transmit power level of the processed modulated signal based, at least in part, on the modulation parameters of the processed modulated signal prior to transmission to the remote device.

* * * * *